May 7, 1940.  M. A. MILLER  2,199,923

PHONOGRAPH NEEDLE

Original Filed Jan. 21, 1938

Inventor:
Melville A. Miller,
By Banning & Banning.
Attorneys.

Patented May 7, 1940

2,199,923

UNITED STATES PATENT OFFICE 2,199,923

PHONOGRAPH NEEDLE

Melville A. Miller, Chicago, Ill.

Application January 21, 1938, Serial No. 186,178
Renewed September 12, 1939

5 Claims. (Cl. 274—38)

The present invention is directed to a phonograph needle of the type or style which employs a hardened metal tip which is welded to the shank of the needle. Phonograph needles are necessarily of diminutive size and are constructed to provide a shank which tapers toward the tip, with the result that, at the point where the tip itself is welded to the shank, the area of metal to which the weld is applied is extremely small, so that it often happens that the needle will be broken at the weld and its usefulness destroyed. The present invention is designed to overcome the above difficulty by providing a sheath or casing which tightly envelops the tapered end of a needle and overlaps the weld, so that the tip will be adequately reinforced, and the joint protected without in any way interfering with the playing capacity of the needle.

It will be understood that the needle of the present invention is of the type or style which is required for repeated use, and that in order to secure the necessary hardness in the tip itself it becomes comparatively brittle or fragile, and in such circumstances an adequate reinforcement of the character herein provided is essential, especially in cases where the needles are used in the operation of coin-controlled phonographs or the like, and in which constant personal supervision is impossible.

Further objects and details will appear from the description of the invention in conjunction with the accompanying drawing, wherein,—

Figure 1:
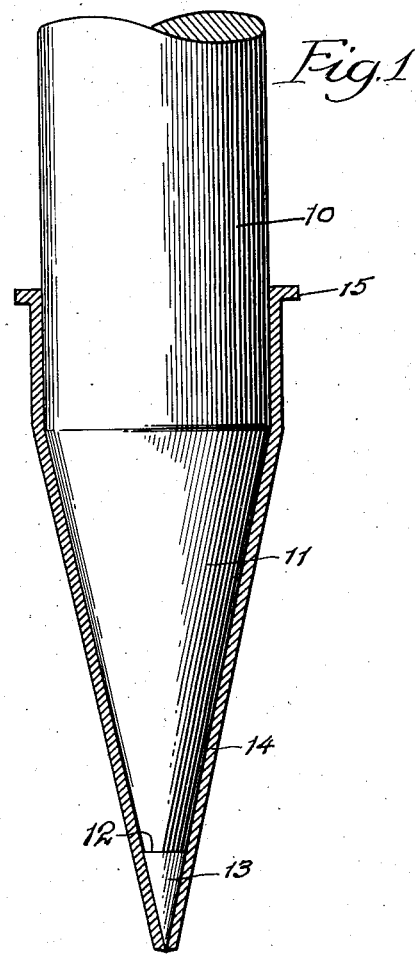
Figure 1 is a very much enlarged sectional elevation of the needle of the present invention, showing the sheath or casing in section.

The needle of the present invention comprises a shank 10 which is tapered at its lower end 11 terminating in an abrupt face 12 which receives the tip 13 which continues the taper to the point which is intended to engage the base of the phonograph record line.

The tip is butt-welded to the face 12 of the shank, and the weld is protected by a sheath 14, the lower portion of which is tapered to tightly embrace the tapered surface of the lower end of the needle shank with the tip welded thereto, while the upper end of the sheath is cylindrical to tightly embrace the upper untapered end of the needle shank.

The needle shank is preferably formed of beryllium copper, and the tip is of a very hard alloy, while the sheath is formed of soft metal such as brass, which will be easily worn away to expose the needle for contact with the side walls of the record line.

It is necessary for the sheath to fit very snugly or tightly around the needle, and for this purpose the surface of the needle shank is machined for an accurate tight fit, and in view of the uniform taper of the parts, the sheath may be applied and tightly wedged in place to overlap the weld and protect the tip.

The upper end of the sheath is preferably provided with an outstanding flange 15, which assists in the positioning of the needle within the sheath during the assembling operation.

Figure 2:
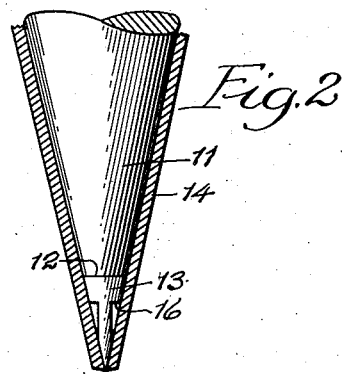
Figs. 2 and 3 are modifications in the tip structure of the needle.

Fig. 2 shows a similar construction, with the exception, however, that the tip is notched on each of two opposite sides to provide a shoulder 16, which notches afford the necessary clearance, so that in the continued playing of the needle it will not in time be worn away in such a manner as to ride upon the rim of the record line and thus prevent the point of the tip from reaching down sufficiently into the record line to properly engage the walls thereof.

By cutting or notching back the tip on opposite sides, as indicated, sufficient metal will be removed to insure the proper entrance of the needle to the necessary degree, since it will be understood that the soft metal of the sheath will readily wear away during playing to the extent necessary to expose the hardened tip of the needle.

Figure 3:
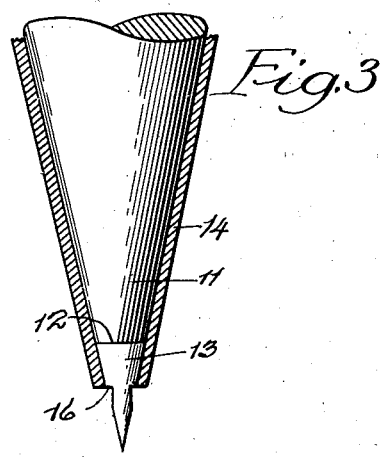

Fig. 3 shows a construction similar to that of Fig. 2, with the exception, however, that the sheath is cut back flush with the shoulder formed by the notching of the tip, so that the pointed tip notched on two of its sides will be exposed.

Figure 4:
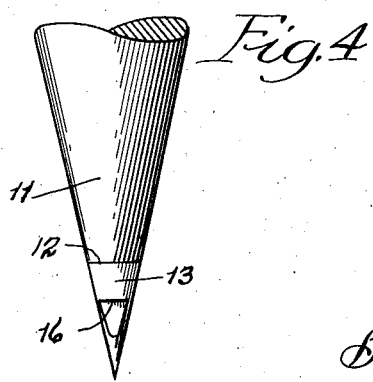
Fig. 4 is a view of the tip at right angles to the view shown in Fig. 3.

It will be understood, however, that the tip is flattened or notched on two sides only, and that the normal taper of the tip continues on the remaining sides, as indicated in Fig. 4.

The present invention is one which tends to materially lengthen the playing life of the needle, and to secure full service therefrom until the tip has been worn away to an objectionable degree, without, however, running the risk of breakage at the weld, which might otherwise occur after a short period of service.

In addition to the reinforcement afforded to the weld by the overlap of the sheath, the tip is mechanically clamped and held by the tapered configuration of the parts, so that the parts will be held rigidly in proper relation to one another, even though the weld should become broken or impaired.

The invention is one which may be easily manufactured, in view of the fact that the tight fitting of the tapered surfaces enables the sheath to be forced into place and firmly held without additional means of attachment, although soldering may be employed if desired.

I claim:

1. A phonograph needle consisting of a shank tapered at its lower end and terminating in a plane surface, a tapered tip of relatively hard material abutted against the terminus of the tapered end of the shank, and a sheath of relatively soft material overlapping the juncture between the shank and the tip and tapered interiorly at its lower end to closely embrace the tapered end of the shank and the upper portion of the tapered tip.

2. A phonograph needle consisting of a shank tapered at its lower end, a tip of relatively hard material fitted to the tapered end of the shank, and a sheath of relatively soft material overlapping the juncture between the tapered shank and the tip, the tip being notched on opposite sides to afford a shoulder behind its acting end and the sheath being tapered interiorly at its lower end to fit snugly against the tapered end of the shank and bridge over the notched portion thereof.

3. A phonograph needle consisting of a shank tapered at its lower end, a tapered tip of relatively hard material fitted to the tapered end of the shank, and a sheath of relatively soft material overlapping the juncture between the tapered shank and the tip, the tip being notched on opposite sides to afford a shoulder behind its acting end, and the sheath terminating at said shoulder and being tapered interiorly in its lower portion to closely embrace the tapered tip above the notched portion and the lower tapered end of the shank.

4. A phonograph needle consisting of a shank of beryllium copper tapered at its lower end, a tapered tip of hard alloy welded to the tapered end of the shank, and a sheath of relatively soft metal tapered at its lower end and overlapping the juncture between the tapered shank and the tapered tip.

5. A phonograph needle consisting of a shank of beryllium copper tapered at its lower end, a tapered tip of hard alloy welded to the tapered end of the shank, and a sheath of relatively soft metal tapered at its lower end and overlapping the juncture between the tapered shank and the tip and terminating behind the acting end of the tapered tip.

MELVILLE A. MILLER.